Dec. 30, 1930.  H. L. MUELLER  1,786,957
BRIDGING RING FOR CUSHION TIRE BASES
Filed Nov. 19, 1925   2 Sheets-Sheet 1
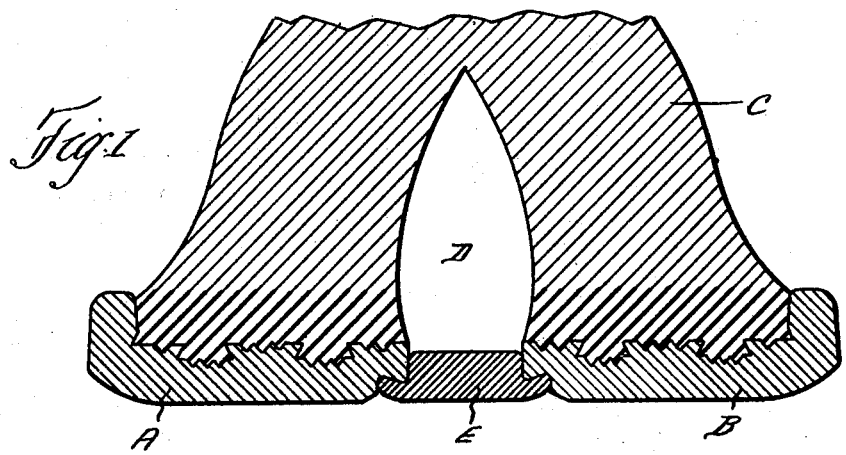
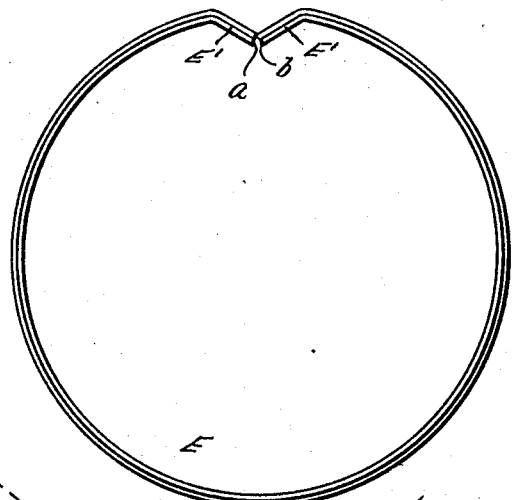
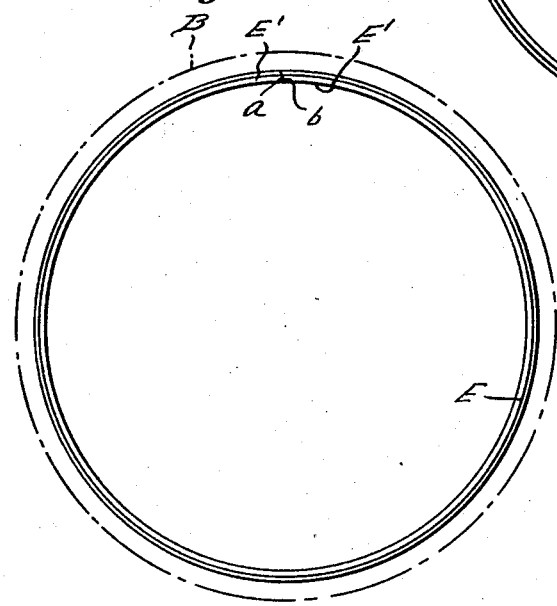
Inventor
Homer L. Mueller
By Hull Broch & West
Attys

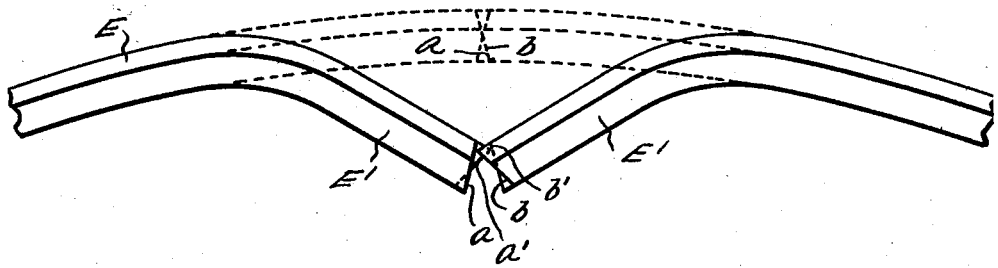
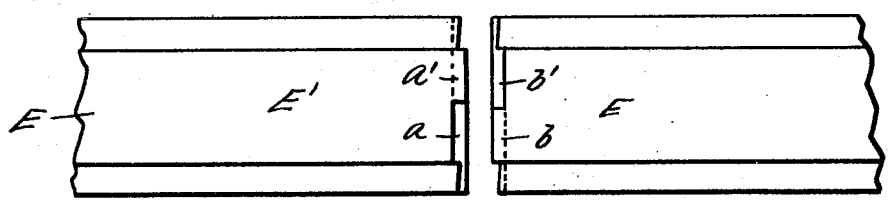
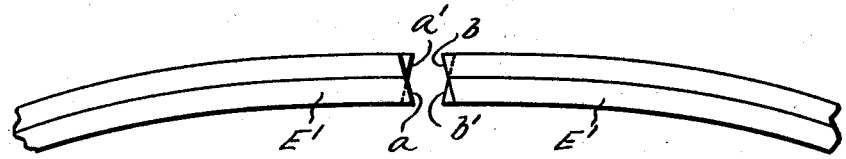
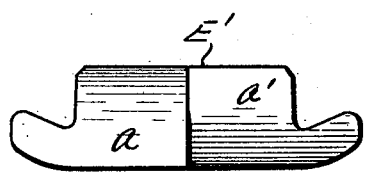

Patented Dec. 30, 1930

1,786,957

UNITED STATES PATENT OFFICE

HOMER L. MUELLER, OF LAKEWOOD, OHIO, ASSIGNOR, BY MESNE ASSIGNMENTS, TO THE CLEVELAND WELDING COMPANY, OF CLEVELAND, OHIO, A CORPORATION OF OHIO

BRIDGING RING FOR CUSHION-TIRE BASES

Application filed November 19, 1925. Serial No. 70,017.

This invention relates generally to vehicle tires having a rubber cushion body of arched or internal recessed form vulcanized on a metal base or rim, and resides mainly in affixing to the two base sections of the rim base a central split ring member which is adapted to interlock with itself and with the side portions of the base and provide a continuous tire base which may be affixed to the wheel body.

In making up tires of this kind the metal base is composed of spaced members to which the cushion tire is vulcanized and a core is provided for the formation of the recess or channel in the rubber body. This core is withdrawn after the vulcanization has been completed and then a central bridge piece or ring is arranged between the spaced base members.

Various methods have been employed for connecting this bridging ring to the base members. In one construction a bridging ring of substantially the same length as the the circumference of the spaced base members was interposed and interlocked with said base members but was not permanently united to said members.

In another construction a one piece transplit bridge ring of the same length as the circumference of the base members was fitted between the base members and the permanently connected thereto by welding; and in a third construction a continuous bridging ring of less length than the circumference of the base members was stretched or expended into engagement with the base members. Both of these methods are objectionable and unsatisfactory because the resultant base when forced upon a metal wheel body is sometimes stretched considerably and the bridging ring being thinner than the base members does not stretch to the same extent and is liable to drop away from the two base members.

According to my invention I provide a one piece transplit ring of greater initial length than the circumference of the base members so shaped as to be insertable between the base members and capable of being forced under compression into the space between the base members and into rigid locked engagement with said base members.

The main object of this invention is to provide a central bridging ring of such construction that the same can be quickly and easily introduced between the base members and then forced into permanent looking relation with the base members. Other objects of the invention will appear as the description proceeds.

This application may be said to be a continuation in part of my co-pending application Serial No. 755,205 filed December 11, 1924.

With the objects enumerated above in view the invention consists in the novel construction and arrangement of parts as will be hereinafter more fully described and pointed out in the appended claims.

In the drawing forming a part of this specification Fig. 1 is a sectional view of my bridging ring secured in a cushion tire base; Fig. 2 is a plan of the bridging ring before the same is inserted; Fig. 3 is a front elevation of the bridging ring as it appears when secured to the base, the base being indicated by dot and dash lines; Fig. 4 is an enlarged fragmentary side elevational view of the bridging ring; Fig. 5 is a plan view of the interengaging ends of the bridging ring; Fig. 6 is a side view of Fig. 5 and Fig. 7 is an enlarged view of one end of the bridging ring.

In carrying out my invention I employ the usual side members A and B to which a cushion tire C is vulcanized, leaving the centrally disposed recess D which imparts the desired resiliency, this recess being formed by means of a suitable core (not shown) which is withdrawn after the vulcanization has been completed. The inner opposed edges of the base members A and B are undercut in opposite directions and the bridging ring E is given a cross sectional shape such as to interlock with the base members, as most clearly shown in Fig. 1.

In making this bridging ring I employ a piece of stock of a length somewhat greater than the circumference of the base members and this stock is rolled into the shape of a ring with the ends E' bent radially inwardly as most clearly shown in Figs. 2 and 4. When the ring E is rolled into shape with the ends E' extending radially inward the desired distance, it is obvious that the ring is contracted somewhat and can therefore be readily inserted between the base members A and B and then by means of any suitable tool or apparatus the ends E' are forced radially outward crowding the entire ring into rigid locked engagement with the base members, the entire one piece ring being placed under compression as contradistinguished to being stretched and placed under tension, and to being of the same length and merely connected by welding. Inasmuch as the ends E' contact with each other when bent radially inward, it is obvious that when pressure is applied to force them radially outward the action of the ring ends is that of a truss and consequently during their entire movement from the position shown in full lines to the position shown in dotted lines the ring is undergoing compression in opposite directions from the slit.

In order to provide a further locking means for permanently locking the bridging ring within the sections A and B the following means are provided: The ring E is shaped in cross section as shown in Fig. 7. The faces of the inner opposed edges of the bridging ring E are shouldered and shaped so as to form an interlock when they are pressed together with their adjacent surfaces abutting each other. In other words, the two halves of the abutting faces of each end of the bridging ring are cut at different angles, that is to say, they are beveled in opposite directions, as shown at a and a' in Fig. 4 and the face of the opposite end of the bridging ring is complementarily beveled as shown at b and b' in Fig. 4, so that when the ends of the bridging ring are placed one against the other as shown in Fig. 5 and are forced radially outward crowding the ring into the rigid base members the bevel faces engage and interlock one with the other and permanently lock the ring against removal unless the same is completely distorted. It will therefore be seen that the bridging ring is rigidly and permanently secured within the base members.

A rim base of this construction has the advantage of being cheaper than those in which the ring is connected by welding while at the same time it has all the mechanical advantages of a one piece ring, and it also has the advantage of rapidity of assemblage inasmuch as the ring can be quickly and easily placed within the rim base and by expanding said ring and at the same time effecting a compression thereof within the rim base a much stronger and durable composite rim base is obtained.

Having thus described my invention, what I claim is:—

1. A split bridging ring for cushion tire base members having a greater initial circumference than the base members with which the ring is to be used, the ends of said ring being bent inwardly, the abutting faces of said ends being shouldered to form an interlock when they are pressed together with the adjacent edges abutting each other.

2. A transplit bridging ring for cushion tire base members, said ring having a greater initial circumference than the base members with which the ring is to be used, the ends of the ring being bent radially inward and the abutting faces of the ends of said ring being complementarily beveled, said ends adapted to be forced outwardly whereby the ends of said ring interlock one with the other.

3. A split bridging ring for cushion tire base members having a greater initial circumference than the base members with which the ring is to be used, the ends of said ring being bent inwardly, one of the abutting faces of said ring having a projection thereon extending a part of the way across the ring and having its underside beveled, the remaining portion of said face being provided with a recess and being beveled in a direction reverse to the first mentioned bevel, the opposite abutting face being complementarily shaped and beveled so as to provide interengaging portions adapted to interlock and secure said ring against removal when the abutting faces are pressed into engagement one with the other.

4. A split bridging ring for cushion tire base members having a greater initial circumference than the base members with which the ring is to be used, one of the abutting faces of said ring having a part of its surface beveled in one direction and the remaining part beveled in the reverse direction, the opposite abutting face of said ring being complementarily beveled whereby to provide interengaging portions adapted to interlock when the abutting faces are pressed together.

5. A split bridging ring for cushion tire base members having a greater initial circumference than the base members with which the ring is to be used and adapted to fit between said base members, a portion of said ring being bent inwardly, one of the abutting faces of said ring having a part of its surface beveled in one direction and the remaining part beveled in the reverse direction, the opposite abutting face of said ring being complementarily beveled whereby to provide interengaging portions adapted to interlock when the abutting faces are pressed together.

In testimony whereof, I hereunto affix my signature.

HOMER L. MUELLER.